(12) United States Patent
Zhu et al.

(10) Patent No.: US 12,513,633 B2
(45) Date of Patent: Dec. 30, 2025

(54) CHANNEL SCATTERING IDENTIFIER FOR WIRELESS NETWORKS

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 646 days.

(21) Appl. No.: 17/945,915

(22) Filed: Sep. 15, 2022

(65) Prior Publication Data
US 2024/0098659 A1 Mar. 21, 2024

(51) Int. Cl.
*H04W 56/00* (2009.01)
*H04L 25/02* (2006.01)
*H04W 24/02* (2009.01)

(52) U.S. Cl.
CPC ....... *H04W 56/001* (2013.01); *H04L 25/0204* (2013.01); *H04W 24/02* (2013.01)

(58) Field of Classification Search
CPC .. H04W 56/001; H04W 24/02; H04L 25/0204
See application file for complete search history.

(56) References Cited

U.S. PATENT DOCUMENTS

| | | | |
|---|---|---|---|
| 2021/0345260 A1* | 11/2021 | Zhu ........................ | H04W 24/10 |
| 2022/0022144 A1* | 1/2022 | Zhu ........................ | H04W 24/10 |
| 2023/0291458 A1* | 9/2023 | Yang ..................... | H04B 7/0632 |
| 2024/0291577 A1* | 8/2024 | Lee ........................ | H04W 52/50 |

* cited by examiner

*Primary Examiner* — Kyaw Z Soe
(74) *Attorney, Agent, or Firm* — Patterson & Sheridan LLP

(57) ABSTRACT

Certain aspects of the present disclosure provide a method of wireless communications by a user equipment (UE), generally including detecting one or more synchronization signal blocks (SSBs) transmitted from a network entity, identifying a channel scattering type based on the detecting, and selecting one or more parameters for beam management, based on the identified channel scattering type.

20 Claims, 10 Drawing Sheets

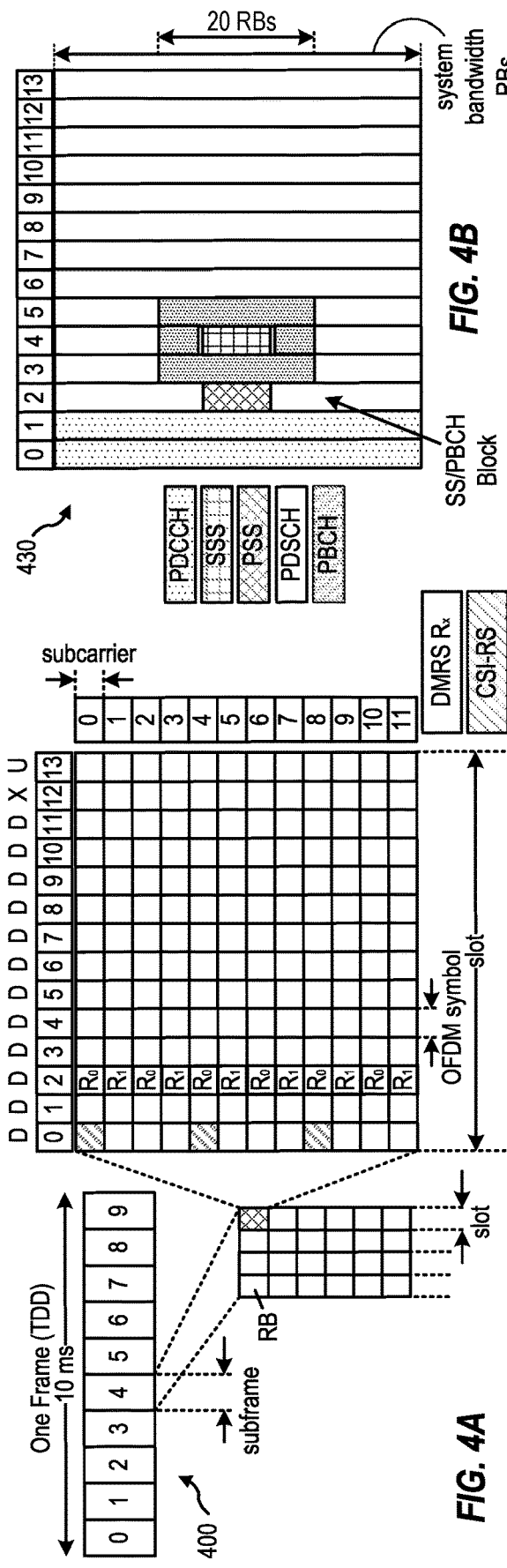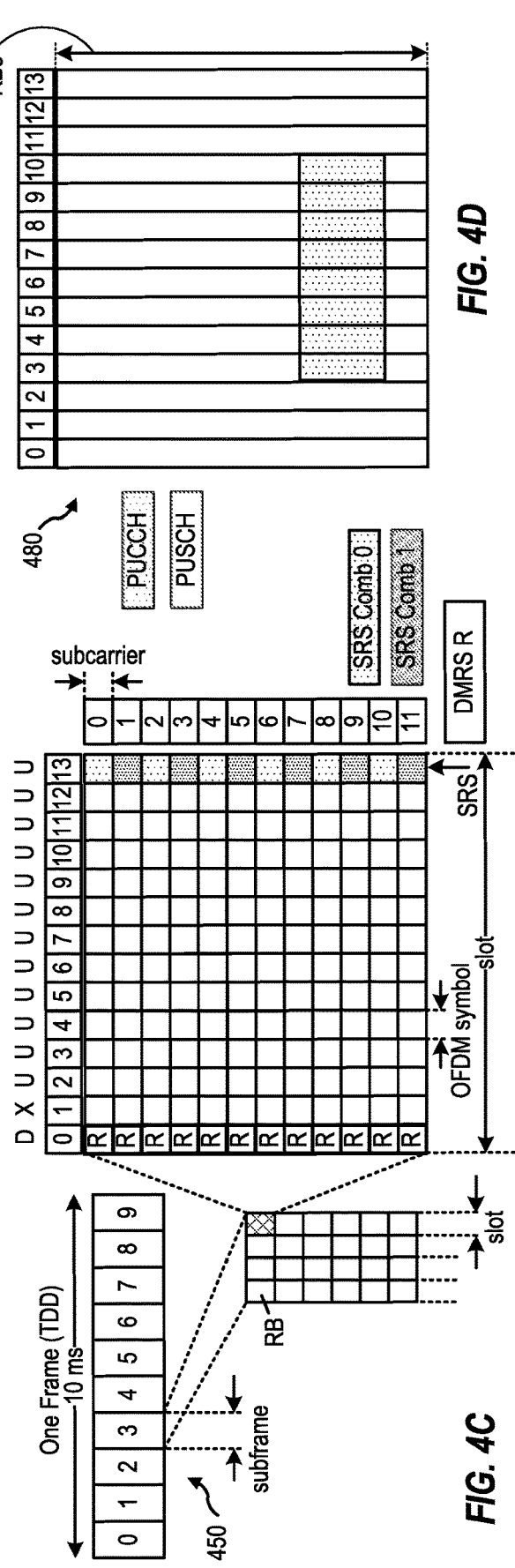
FIG. 4A
FIG. 4B
FIG. 4C
FIG. 4D

CHANNEL SCATTERING IDENTIFIER FOR WIRELESS NETWORKS

BACKGROUND

Field of the Disclosure

Aspects of the present disclosure relate to wireless communications, and more particularly, to techniques for selecting beam management parameters based on a channel scattering type.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes detecting one or more synchronization signal blocks (SSBs) transmitted from a network entity; identifying a channel scattering type based on the detecting; and selecting one or more parameters for beam management, based on the identified channel scattering type.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Figure 1:
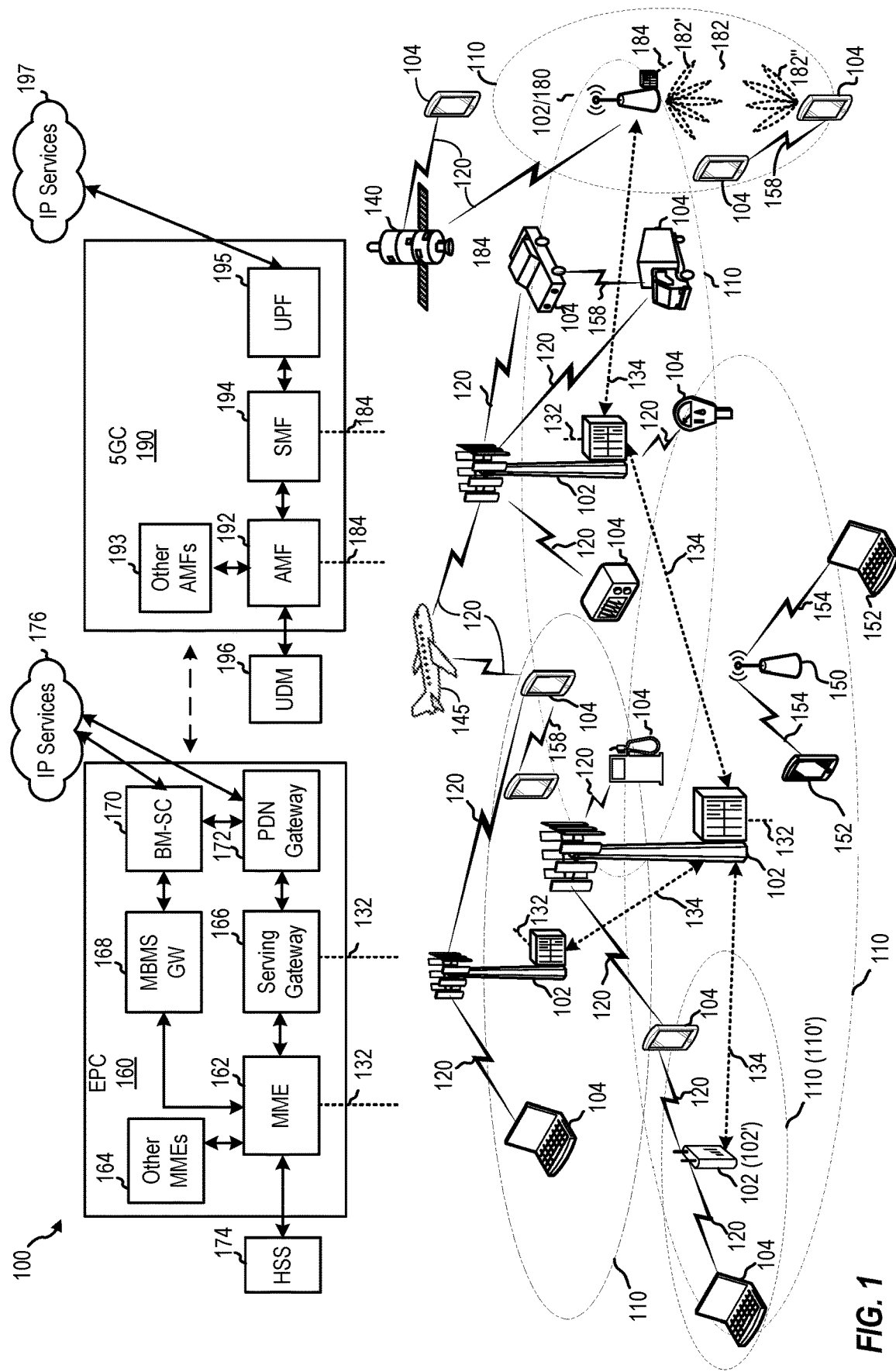
FIG. 1 depicts an example wireless communications network.

Aspects of the present disclosure relate to wireless communications, and more particularly, to techniques for a user equipment (UE) to select beam management parameters based on a channel scattering type.

Advanced wireless systems, such as 5G New Radio (NR), support ever increasing data rates for growing numbers of users. The increase data rates help support a variety of services, such as video streaming, as well as traffic from Internet-of-Things (IoT). Millimeter wave (mmWave) frequencies, due to large available bandwidth (100s of Mhz), can be used to achieve high throughput in both uplink and downlink directions.

mmWave signals are highly directional and the propagation characteristics present certain challenges and can experience high path loss over short distances. For example, a phenomenon known as low knife-edge diffraction (that occurs when a mmWave strikes a sharp edge and bends) may cause the non-line of sight radio link to be very weak. High absorption and building penetration also makes reflected paths of mmWave signals poor. Even attenuation due to foliage is significant enough to cause radio link failure (RLF) at mmWave frequencies.

As a result, in systems utilizing mmWave, a UE may need to select its (transmit and receive) parameters based on channel scattering types, such as whether a channel is line of sight (LoS) or non-LOS (NLoS) for performance optimization. This is because NLoS channels may have more reflected signal paths that could be candidates for signal transmission. Thus, it may be beneficial in NLoS channel conditions to evaluate more synchronization signal blocks (SSBs) that are transmitted from a network in different directions.

The various types of parameters that may be selected based on channel scattering types may include an SSB sleep threshold, accounting for number of SSBs that need tracking. As noted above, in a poor scattered channel (with few signal paths), such as LoS, clustered delay line (CDL) type-D (CDL-D), only a few SSBs may be strong enough that they need tracking. CDL generally refers to a technique to model a channel when the received signal consists of multiple delayed clusters, where each cluster contains multipath components with a same delay, but with slight variations for angles of departure (AoD) and angles of arrival (AoA). In a rich scattered channel (with a greater number of signal paths), such as NLoS or CDL Type-B (CDL-B), many SSBs may be sufficiently strong and need tracking.

Other parameters that may be selected based on channel scattering types include an SSB down-sampling factor, accounting for a number of UE beams that need tracking, filtering coefficients for beam measurement, time and power hysteresis factors for beam switching. Unfortunately, most modem beam management designs do not consider environmental (channel) scattering, which may result in significant performance degradation.

Aspects of the present disclosure provide a channel scattering identifier that may allow a UE (e.g., with a 5G NR mmW modem) to apply appropriate parameters in different scenarios. By selecting parameters that are appropriate for the channel scattering type, performance may be improved (e.g., by tracking an appropriate number of SSBs and beams), while conserving power where appropriate (by limiting unnecessary SSB/beam tracking).

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
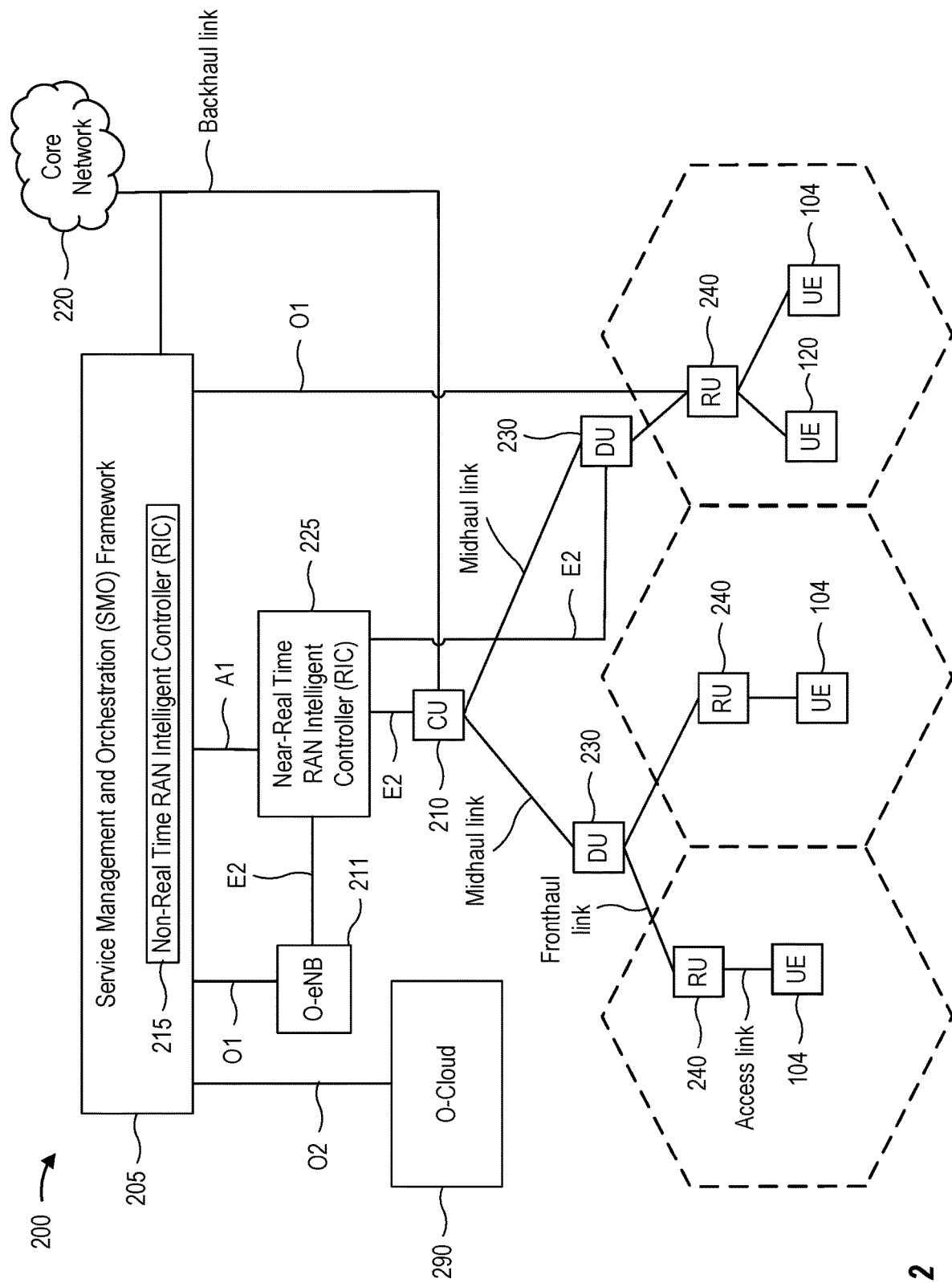
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182"'. BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
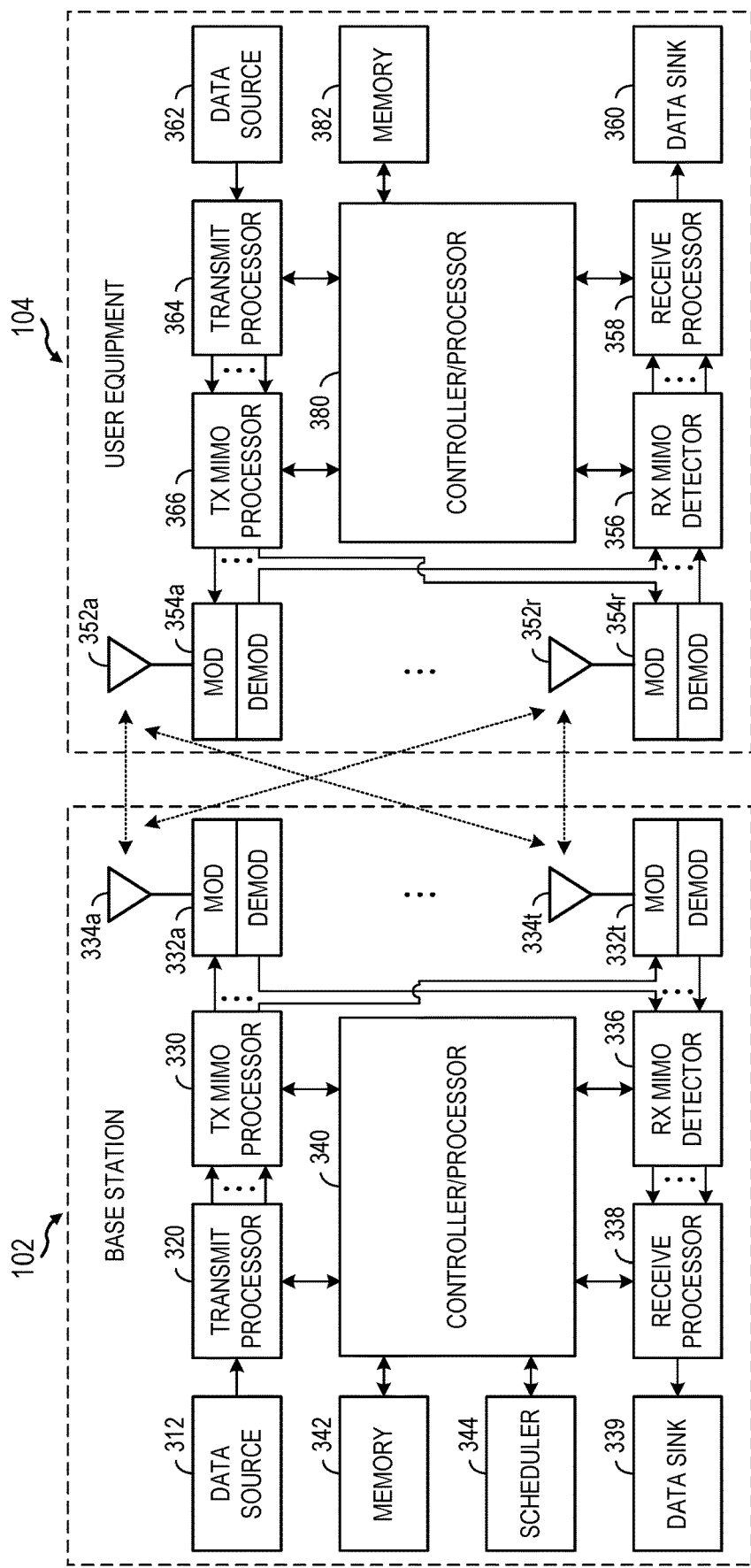
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of SSBs Measurement Using Transmit and Receive Beams

Figure 5:
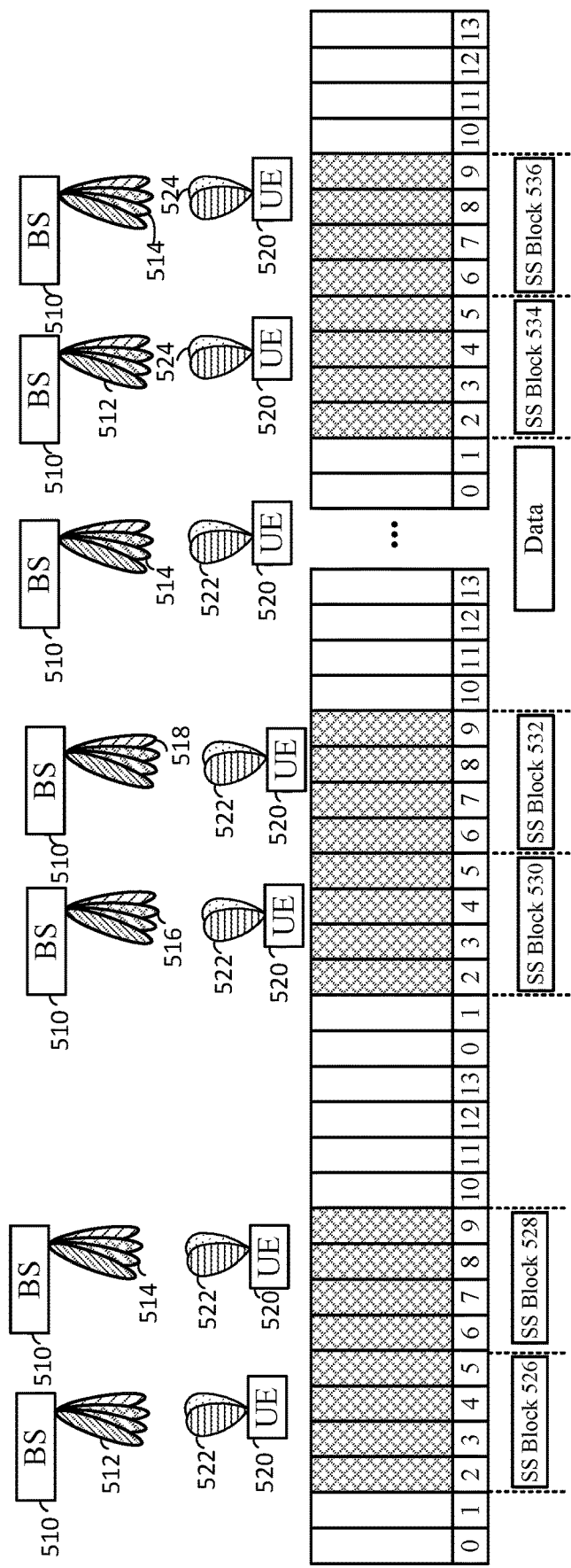
FIG. 5 illustrates example transmit and receive beams for SSB measurement, in accordance with certain aspects of the present disclosure.
Figure 6:
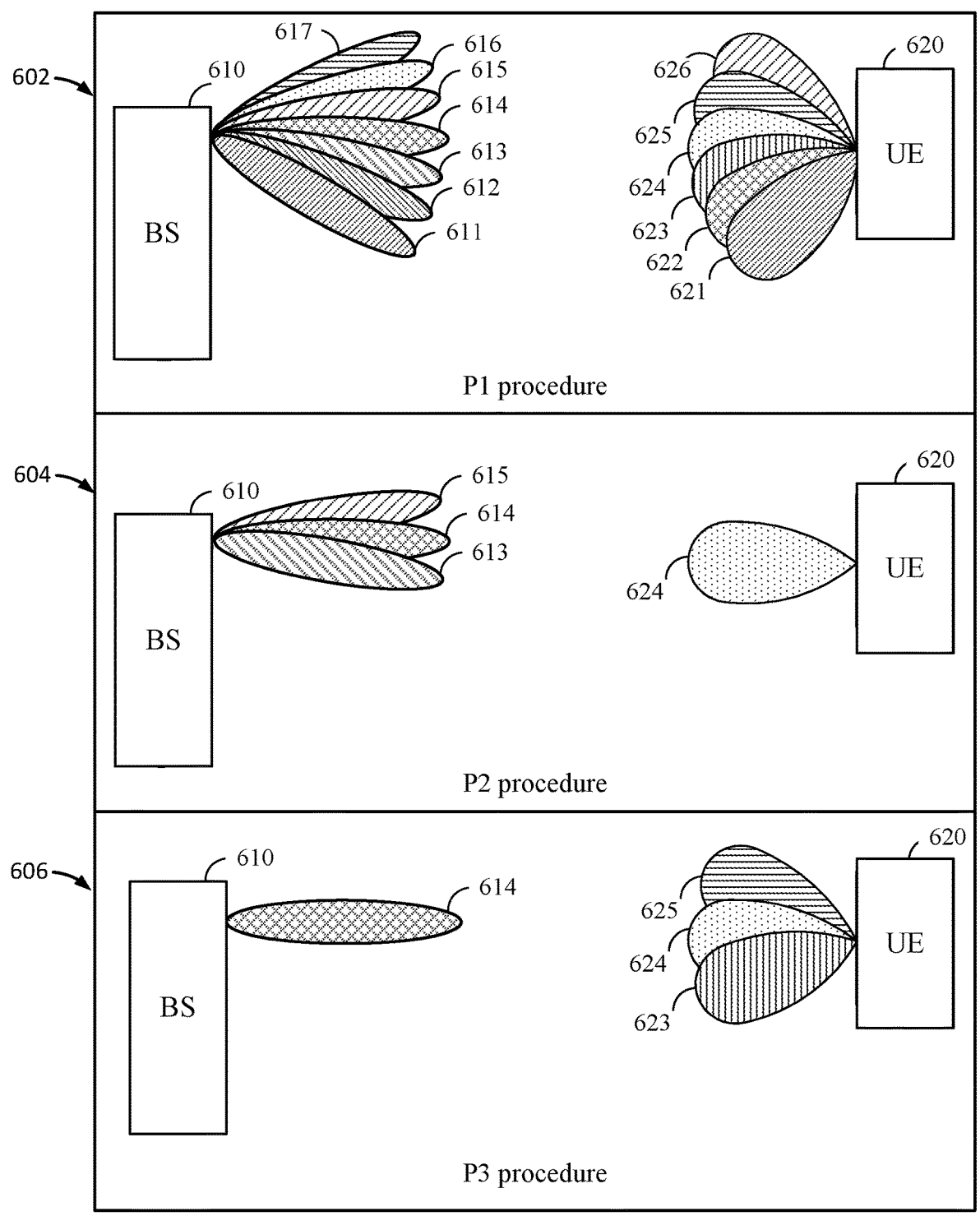
FIG. 6 illustrates example beam management procedures, in accordance with certain aspects of the present disclosure.

As shown in FIG. 5, the SSBs can be used for measurements using different transmit and receive beams, to identify and establish transmit and receive beam pair links (BPSs), for example accordingly to a beam management procedure such as the P1 procedure 602 shown in FIG. 6.

FIG. 5 illustrates an example for a BS 510 (e.g., such as the BS 110a) that uses 4 TX beams and a UE 520 (e.g., such as the UE 120a) that uses 2 RX beams. For each SSB, the BS 510 uses a different TX beam BS to transmit the SSB. As shown in FIG. 5, the UE 520 can scan its RX beam 522 while the BS 510 transmits SSBs 526, 528, 530, 532 sweeping its four TX beams 512, 514, 516, 518 respectively. A beam pair link (BPL) may be identified and used for data communication over a period as discussed. As shown in FIG. 5, the BS 510 uses the TX beam 514 and the UE 520 uses the RX beam 522 for data communication for a period. The UE 510 may then scan its RX beam 524 while the BS 510 transmits SSBs 526, 528 sweeping its TX beams 512, 514, and so on.

As can be seen, as the number of TX/RX beams increases, the number of scans for the UE to scan each of its RX beams over each TX beam can become large. Power consumption may scale linearly with the number of measured SSBs. Thus, the time and power overhead associated with beam management may become large if all beams are actually scanned.

In 5G NR, the beam management procedure for determining of BPLs may be referred to as a P1 procedure. FIG. 6 illustrates an example P1 procedure 602. A BS 610 (e.g., such as the BS 110a) may send a measurement request to a UE 620 (e.g., such as the UE 120a) and may subsequently transmit one or more signals (sometimes referred to as the "P1-signal") to the UE 620 for measurement. In the P1 procedure 602, the BS 610 transmits the signal with beam forming in a different spatial direction (corresponding to a transmit beam 611, 612, . . . , 617) in each symbol, such that several (e.g., most or all) relevant spatial locations of the cell of the BS 610 are reached. In this manner, the BS 610 transmits the signal using different transmit beams over time in different directions. In some examples, a SSB is used as the P1-signal. In some examples, channel state information reference signal (CSI-RS), demodulation reference signal (DMRS), or another downlink signal can be used as the P1-signal.

In the P1 procedure 602, to successfully receive at least a symbol of the P1-signal, the UE 620 finds (e.g., determines/selects) an appropriate receive beam (621, 622, . . . , 626). Signals (e.g., SSBs) from multiple BSs can be measured simultaneously for a given signal index (e.g., SSB index) corresponding to a given time period. The UE 620 can apply a different receive beam during each occurrence (e.g., each symbol) of the P1-signal. Once the UE 620 succeeds in receiving a symbol of the P1-signal, the UE 620 and BS 610 have discovered a BPL (i.e., the UE RX beam used to receive the P1-signal in the symbol and the BS TX beam used to transmit the P1-signal in the symbol). In some cases, the UE 620 does not search all of its possible UE RX beams until it finds best UE RX beam, since this causes additional delay. Instead, the UE 620 may select a RX beam once the RX beam is "good enough", for example, having a quality (e.g., SNR) that satisfies a threshold (e.g., predefined threshold). The UE 620 may not know which beam the BS 610 used to transmit the P1-signal in a symbol; however, the UE 620 may report to the BS 610 the time at which it observed the signal. For example, the UE 620 may report the symbol index in which the P1-signal was successfully received to the BS 610. The BS 610 may receive this report and determine which BS TX beam the BS 610 used at the indicated time. In some examples, the UE 620 measures signal quality of the P1-signal, such as reference signal receive power (RSRP) or another signal quality parameter (e.g., SNR, channel flatness, etc.). The UE 620 may report the measured signal quality (e.g., RSRP) to the BS 610 together with the symbol index. In some cases, the UE 620 may report multiple symbol indices to the BS 610, corresponding to multiple BS TX beams.

As a part of a beam management procedure, the BPL used between a UE 620 and BS 610 may be refined/changed. For example, the BPL may be refined periodically to adapt to changing channel conditions, for example, due to movement of the UE 620 or other objects, fading due to Doppler spread, etc. The UE 620 can monitor the quality of a BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam management procedures for beam refinement of BPLs may be referred to as the P2 and P3 procedures to refine the BS-beam and UE-beam, respectively, of an individual BPL.

FIG. 6 illustrates an example P2 procedure 604 and P3 procedure 606. As shown in FIG. 6, for the P2 procedure 604, the BS 610 transmits symbols of a signal with different BS-beams (e.g., TX beams 615, 614, 613) that are spatially close to the BS-beam of the current BPL. For example, the BS 610 transmits the signal in different symbols using neighboring TX beams (e.g., beam sweeps) around the TX beam of the current BPL. As shown in FIG. 6, the TX beams used by the BS 610 for the P2 procedure 604 may be different from the TX beams used by the BS 610 for the P1 procedure 602. For example, the TX beams used by the BS 610 for the P2 procedure 604 may be spaced closer together and/or may be more focused (e.g., narrower) than the TX beams used by the BS 610 for the P1 procedure. During the P2 procedure 604, the UE 620 keeps its RX beam (e.g., RX beam 624) constant. The UE 620 may measure the signal quality (e.g., RSRP) of the signal in the different symbols and indicate the symbol in which the highest signal quality was measured. Based on the indication, the BS 610 can determine the strongest (e.g., best, or associated with the highest signal quality) TX beam (i.e., the TX beam used in the indicated symbol). The BPL can be refined accordingly to use the indicated TX beam.

As shown in FIG. 6, for the P3 procedure 606, the BS 620 maintains a constant TX beam (e.g., the TX beam of the current BPL) and transmits symbols of a signal using the constant TX beam (e.g., TX beam 614). During the P3 procedure 606, the UE 620 scans the signal using different RX beams (e.g., RX beams 623, 624, 625) in different symbols. For example, the UE 620 may perform a sweep using neighboring RX beams to the RX beam in the current BPL (i.e., the BPL being refined). The UE 620 may measure the signal quality (e.g., RSRP) of the signal for each RX beam and identify the strongest UE RX beam. The UE 620 may use the identified RX beam for the BPL. The UE 620 may report the signal quality to the BS 610.

Aspects Related to Channel Scattering Identifier

Aspects of the present disclosure provide techniques for a UE to select beam management parameters based on a channel scattering type. For example, based on a channel scattering identifier, a UE may determine what parameters to apply in different channel scattering scenarios.

As noted above, in systems utilizing mmWave, a UE may need to select parameters based on channel scattering types, such as whether a channel is LoS or NLoS, because NLoS channels may have more reflected signal paths, that could be candidates for signal transmission. Thus, it may be beneficial in NLoS channel conditions to evaluate more SSBs that are transmitted from a network in different directions and/or to evaluate more UE beams.

Figure 7:
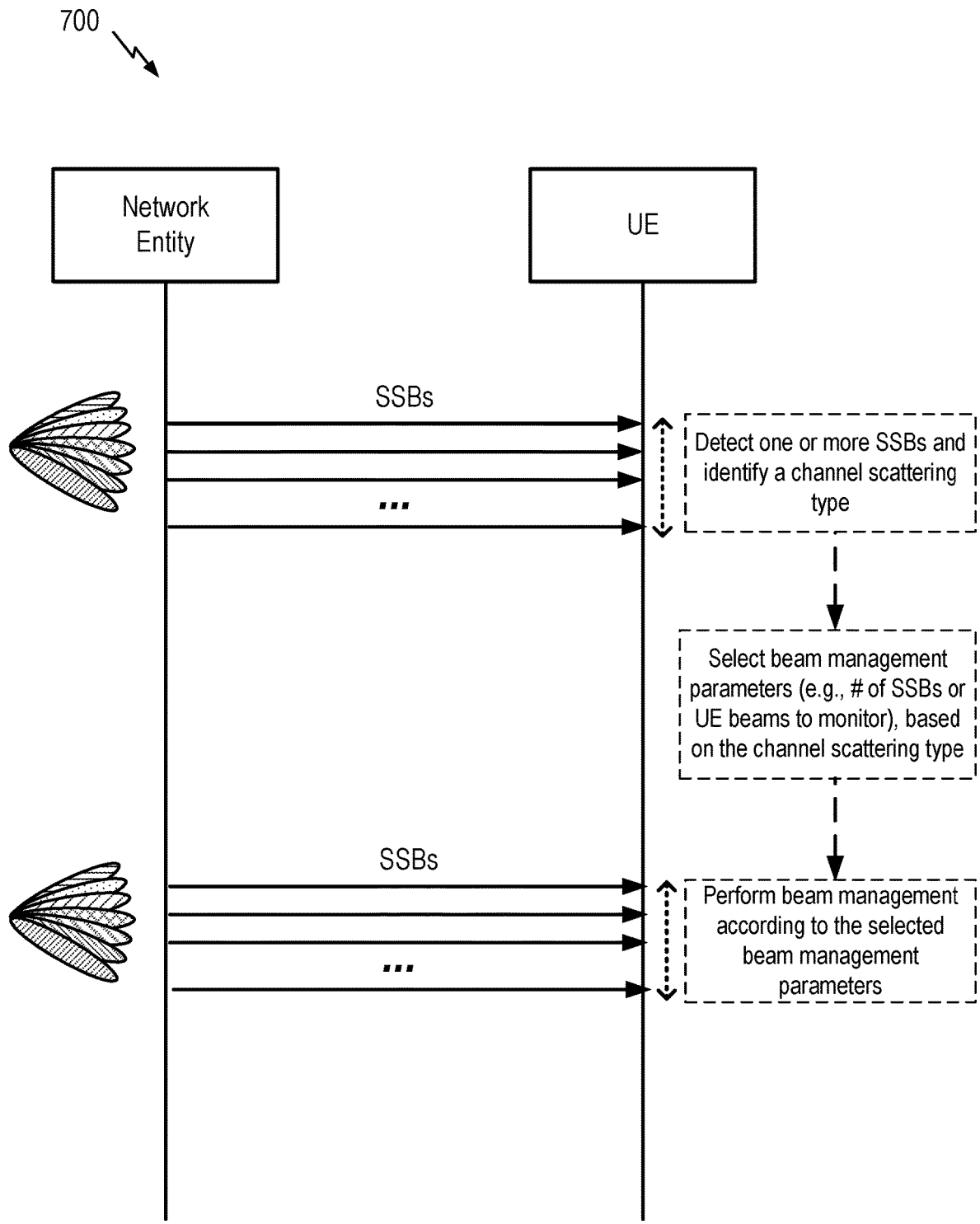
FIG. 7 depicts a call flow diagram for beam management, in accordance with certain aspects of the present disclosure.

FIG. 7 depicts a call flow diagram for beam management that takes channel scattering type into consideration, in accordance with certain aspects of the present disclosure.

As illustrated, a UE may detect one or more SSBs transmitted by a network entity (e.g., a gNB or node of a disaggregated base station). Based on the detected SSBs, the UE may identify a channel scattering type.

In some cases, the UE may count a number of SSBs with received signal strength above a threshold value. Based on this count, the UE may identify a channel scattering type as rich or poor. For example, if the number of strong SSBs is less than or equal to a first threshold value, the UE may identify the channel scattering type as poor (e.g., LoS or CDL-D). On the other hand, if the number of strong SSBs is greater than or equal to a second threshold value, the UE may identify the channel scattering type as rich (e.g., NLoS or CDL-B).

After identifying the channel scattering type, the UE may then select beam management parameters and perform beam management accordingly. As noted above, there are various types of parameters that may be selected based on channel scattering types.

One example parameter is an SSB sleep threshold that accounts for a number of SSBs that need tracking. As noted above, in a poor scattered channel, such as LoS or CDL-D, only a few SSBs may be strong enough that they need tracking. In a rich scattered channel, such as NLoS or CDL-B, many SSBs may be sufficiently strong and need tracking. Selecting the appropriate number of SSBs may help ensure system performance without unnecessary scanning (which wastes power).

Other parameters that may be selected based on channel scattering types include an SSB down-sampling factor, accounting for a number of UE beams that need tracking. In a poor scattered channel, only a few UE beams (or even single UE beam) may be strong and need tracking. In a rich scattered channel, many UE beams may be strong and may need to be tracked.

Other parameters that may be selected based on channel scattering types include filtering coefficients for beam measurement (e.g., coefficients for a filtering algorithm that determine how many previous measurements are considered). For example, in a rich scattered channel, (large) coefficients resulting in a deep filter may be beneficial to smooth out Doppler/noise effects and avoid rapid (ping-pong) beam switching or cell handovers. In a poor scattered channel, (small) coefficients corresponding to a shallow filter may be preferred to track sudden changes.

Other parameters that may be selected based on channel scattering types include time and power hysteresis factors for beam switching. In a rich scattered channel, long time and high power hysteresis may be beneficial to smooth out Doppler and noise effects and avoid ping-pong scenarios for beam switching or cell handover. In a poor scattered channel, short time and low power hysteresis may be preferred, in order to track sudden changes.

By selecting the various beam management parameters based on a channel scattering identifier, a UE may adapt beam management to different channel scattering scenarios.

The selected beam management parameters may be used for beam management procedures, on each detected SSB, to select the best UE beam (which may be referred to as UE_b) in terms of certain beam metric, such as reference signal received power (RSRP). In some cases, some amount of hysteresis may be applied in order to avoid ping-pong switching between beams. In some cases, a UE may monitor UE_b on each SSB periodically to make sure UE_b is always up-to-date.

The selected beam management parameters may also be used to maintain a best gNB beam (which may be referred to as gNB_b) corresponding to an SSB in terms of certain beam metric, such as RSRP. In some cases, some amount of hysteresis may be applied in order to avoid ping-pong switching between beams.

As indicated above, in some cases, to determine set of strong SSBs, the UE may compare RSRP of SSBs to a threshold, such that:

SSB_strong={SSBid|$R$(SSBid)>$R$_max−$TH$_scattering}.

As noted above, the UE may count the number of strong SSBs (num_strong_SSB). As described above, the UE may identify a channel as being poor scattered if a number of strong SSBs is less than or equal to a first threshold (e.g., num_strong_SSB≤TH_poor) or may identify the channel to be rich scattered if the number of strong SSBs is greater than a second threshold (e.g., num_strong_SSB≥TH_rich).

Figure 8A:
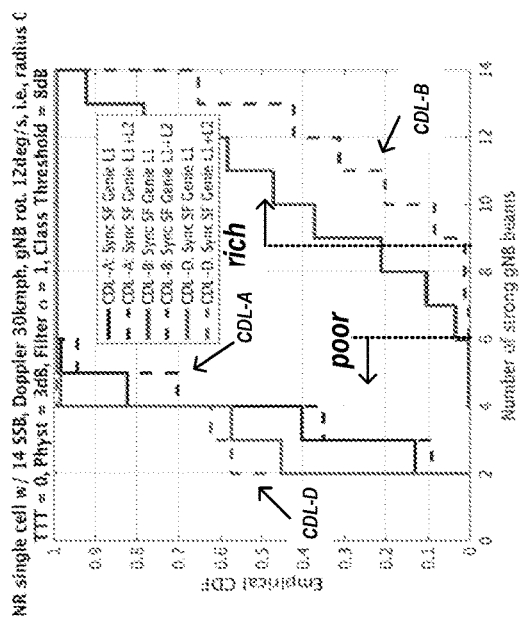
FIGS. 8A, 8B, and 8C depict examples of channel scattering type classification, in accordance with certain aspects of the present disclosure.
Figure 8B:
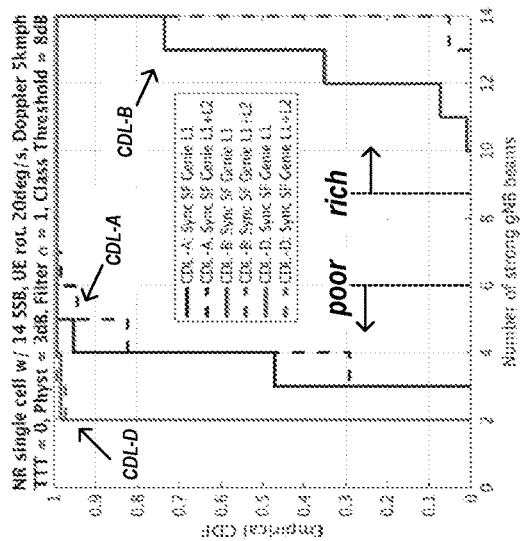
Figure 8C:
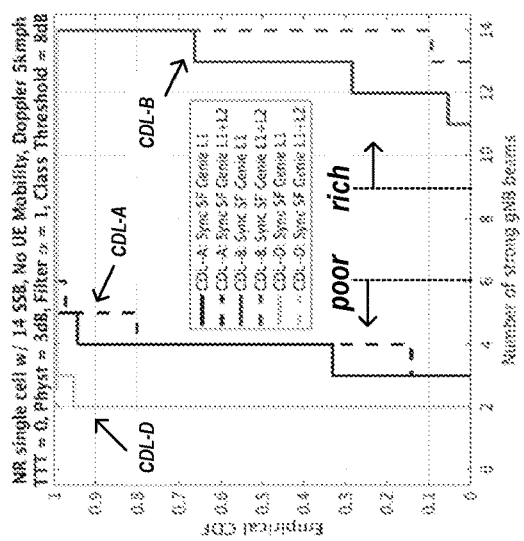

FIGS. 8A-8C illustrate graphs that show how these thresholds may be used to classify a channel as poor scattered or rich scattered based on the number strong SSBs (or gNB beams) in different UE scenarios. In the illustrated examples, the threshold for determining an SSB is strong (for scattering type identification purposes) is 12 dB, TH_rich=9, and TH_poor=6. The graphs also illustrate how well the classification as rich scattered or poor scattered is able to capture different CDL types.

As illustrated in FIG. 8A, the thresholds (of TH_poor=6 and TH_rich=9) correctly identify CDL-A and CDL-D as poor scattered channels and CDL-B as a rich scattered channel for a stationary UE. Similarly, as illustrated in FIG. 8B, the thresholds correctly identify CDL-A and CDL-D as poor scattered channels and CDL-B as a rich scattered channel for a UE with rotation of 20 degrees per second. As illustrated in FIG. 8C, the thresholds correctly identify CDL-A and CDL-D as poor scattered channels and CDL-B as a rich scattered channel for a UE circling a gNB at 30 kilometers per hour.

Aspects of the present disclosure propose a channel scattering identifier that may be used in beam management procedures for 5G NR using mmWave, to distinguish between rich and poor scattering environments (e.g. LoS vs. NLoS). Based on the channel scattering identifier, a UE may select and apply appropriate modem parameters in different motion states for enhanced performance. The techniques presented herein may thus help increase performance (e.g., downlink throughput and signal to noise ratio (SNR)), by monitoring an appropriate number of SSBs and UE beams.

Example Operations of a User Equipment

Figure 9:
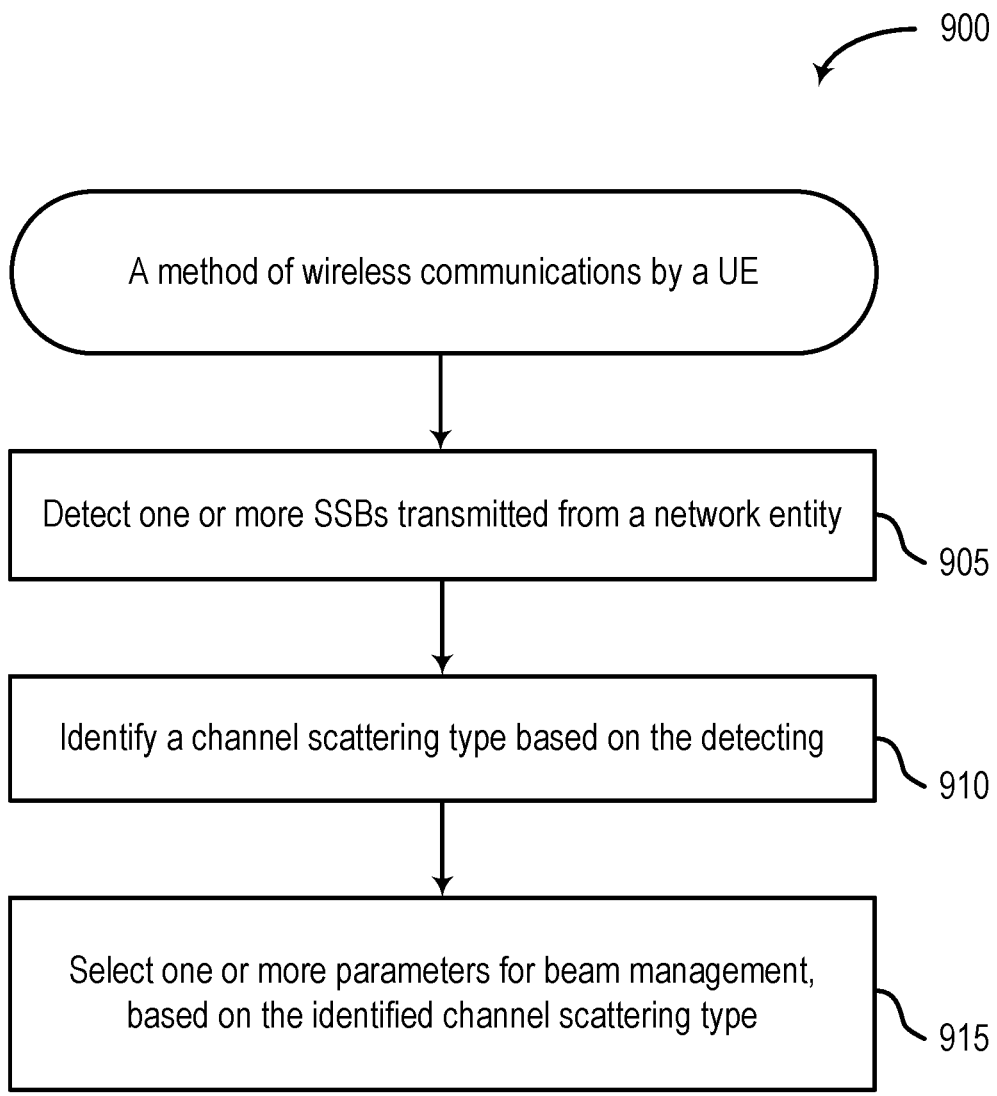
FIG. 9 depicts a method for wireless communications.

FIG. 9 shows an example of a method 900 for wireless communications by a UE, such as UE 104 of FIGS. 1 and 3.

Method 900 begins at step 905 with detecting one or more SSBs transmitted from a network entity. In some cases, the operations of this step refer to, or may be performed by, circuitry for detecting and/or code for detecting as described with reference to FIG. 10.

Method 900 then proceeds to step 910 with identifying a channel scattering type based on the detecting. In some cases, the operations of this step refer to, or may be performed by, circuitry for identifying and/or code for identifying as described with reference to FIG. 10.

Method 900 then proceeds to step 915 with selecting one or more parameters for beam management, based on the identified channel scattering type. In some cases, the operations of this step refer to, or may be performed by, circuitry for selecting and/or code for selecting as described with reference to FIG. 10.

In some aspects, the detecting comprises: determining a set of one or more SSBs with received signal strength above a threshold value; and counting a number of SSBs in the set.

In some aspects, the identifying comprises: identifying a first channel scattering type if the number of SSBs in the set is less than or equal to a first threshold value.

In some aspects, the identifying comprises: identifying a second channel scattering type if the number of SSBs in the set is greater than or equal to a second threshold value.

In some aspects, the second threshold value is greater than the first threshold value by an offset value to provide hysteresis.

In some aspects, the selecting one or more parameters for beam management, based on the identified channel scattering type comprises: selecting a number of SSBs for the UE to monitor, based on the identified channel scattering type.

In some aspects, the selecting one or more parameters for beam management, based on the identified channel scattering type comprises: selecting a number of UE beams for the UE to monitor, based on the identified channel scattering type.

In some aspects, the number of UE beams selected depends on a down sampling factor determined based on the identified channel scattering type.

In some aspects, the selecting one or more parameters for beam management, based on the identified channel scattering type comprises: selecting one or more filtering coefficients for beam management, based on the identified channel scattering type.

In some aspects, the selecting one or more parameters for beam management, based on the identified channel scattering type comprises at least one of: selecting a time hysteresis parameter for beam switching, based on the identified channel scattering type; or selecting a power hysteresis parameter for beam switching, based on the identified channel scattering type.

Figure 10:
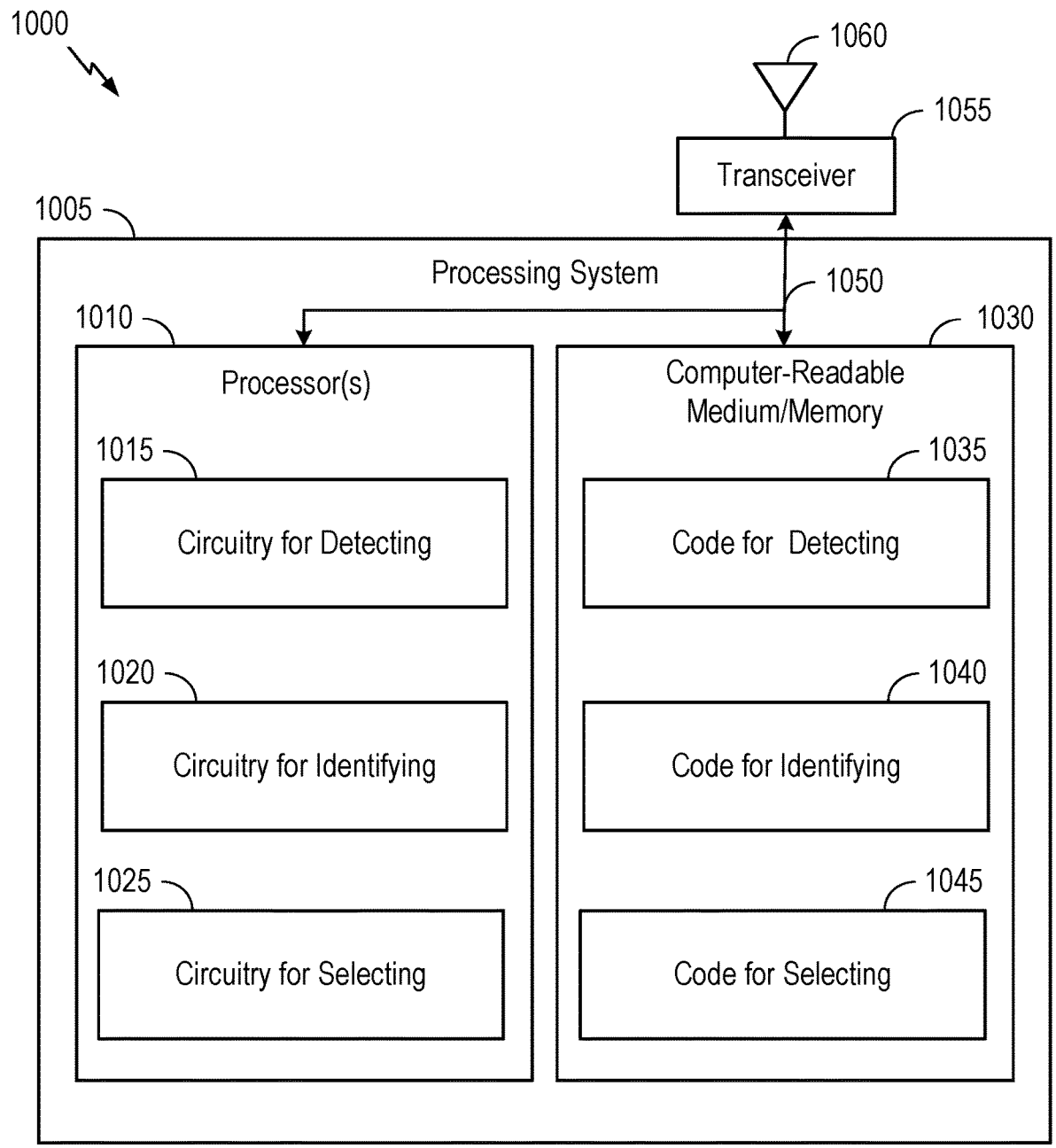
FIG. 10 depicts aspects of an example communications device.

In one aspect, method 900, or any aspect related to it, may be performed by an apparatus, such as communications device 1000 of FIG. 10, which includes various components operable, configured, or adapted to perform the method 900. Communications device 1000 is described below in further detail.

Note that FIG. 9 is just one example of a method, and other methods including fewer, additional, or alternative steps are possible consistent with this disclosure.

Example Communications Device

FIG. 10 depicts aspects of an example communications device 1000. In some aspects, communications device 1000 is a user equipment, such as UE 104 described above with respect to FIGS. 1 and 3.

The communications device 1000 includes a processing system 1005 coupled to the transceiver 1055 (e.g., a transmitter and/or a receiver). The transceiver 1055 is configured to transmit and receive signals for the communications device 1000 via the antenna 1060, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1030 via a bus 1050. In certain aspects, the computer-readable medium/memory 1030 is configured to store instructions (e.g., computer-executable code) that when executed by the one or more processors 1010, cause the one or more processors 1010 to perform the method 900 described with respect to FIG. 9, or any aspect related to it. Note that reference to a processor performing a function of communications device 1000 may include one or more processors 1010 performing that function of communications device 1000.

In the depicted example, computer-readable medium/memory 1030 stores code (e.g., executable instructions), such as code for detecting 1035, code for identifying 1040, and code for selecting 1045. Processing of the code for detecting 1035, code for identifying 1040, and code for selecting 1045 may cause the communications device 1000 to perform the method 900 described with respect to FIG. 9, or any aspect related to it.

The one or more processors 1010 include circuitry configured to implement (e.g., execute) the code stored in the computer-readable medium/memory 1030, including circuitry such as circuitry for detecting 1015, circuitry for identifying 1020, and circuitry for selecting 1025. Processing with circuitry for detecting 1015, circuitry for identifying 1020, and circuitry for selecting 1025 may cause the communications device 1000 to perform the method 900 described with respect to FIG. 9, or any aspect related to it.

Various components of the communications device 1000 may provide means for performing the method 900 described with respect to FIG. 9, or any aspect related to it. For example, means for transmitting, sending or outputting for transmission may include transceivers 354 and/or antenna(s) 352 of the UE 104 illustrated in FIG. 3 and/or the transceiver 1055 and the antenna 1060 of the communications device 1000 in FIG. 10. Means for receiving or obtaining may include transceivers 354 and/or antenna(s) 352 of the UE 104 illustrated in FIG. 3 and/or the transceiver 1055 and the antenna 1060 of the communications device 1000 in FIG. 10.

Example Clauses

Implementation examples are described in the following numbered clauses:

Clause 1: A method of wireless communications by a UE, comprising: detecting one or more SSBs transmitted from a network entity; identifying a channel scattering type based on the detecting; and selecting one or more parameters for beam management, based on the identified channel scattering type.

Clause 2: The method of Clause 1, wherein the detecting comprises: determining a set of one or more SSBs with received signal strength above a threshold value; and counting a number of SSBs in the set.

Clause 3: The method of Clause 2, wherein the identifying comprises: identifying a first channel scattering type if the number of SSBs in the set is less than or equal to a first threshold value.

Clause 4: The method of Clause 3, wherein the identifying comprises: identifying a second channel scattering type if the number of SSBs in the set is greater than or equal to a second threshold value.

Clause 5: The method of Clause 4, wherein the second threshold value is greater than the first threshold value by an offset value to provide hysteresis.

Clause 6: The method of any one of Clauses 1-5, wherein the selecting one or more parameters for beam management, based on the identified channel scattering type comprises: selecting a number of SSBs for the UE to monitor, based on the identified channel scattering type.

Clause 7: The method of any one of Clauses 1-6, wherein the selecting one or more parameters for beam management, based on the identified channel scattering type comprises: selecting a number of UE beams for the UE to monitor, based on the identified channel scattering type.

Clause 8: The method of Clause 7, wherein the number of UE beams selected depends on a down sampling factor determined based on the identified channel scattering type.

Clause 9: The method of any one of Clauses 1-8, wherein the selecting one or more parameters for beam management, based on the identified channel scattering type comprises: selecting one or more filtering coefficients for beam management, based on the identified channel scattering type.

Clause 10: The method of any one of Clauses 1-9, wherein the selecting one or more parameters for beam management, based on the identified channel scattering type comprises at least one of: selecting a time hysteresis parameter for beam switching, based on the identified channel scattering type; or selecting a power hysteresis parameter for beam switching, based on the identified channel scattering type.

Clause 11: An apparatus, comprising: a memory comprising executable instructions; and a processor configured to execute the executable instructions and cause the apparatus to perform a method in accordance with any one of Clauses 1-10.

Clause 12: An apparatus, comprising means for performing a method in accordance with any one of Clauses 1-10.

Clause 13: A non-transitory computer-readable medium comprising executable instructions that, when executed by a processor of an apparatus, cause the apparatus to perform a method in accordance with any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications by a user equipment (UE), the method comprising:
   detecting one or more synchronization signal blocks (SSBs) transmitted from a network entity;
   identifying a channel scattering type based on the detecting; and
   selecting one or more parameters for beam management, based on the identified channel scattering type, wherein the selecting the one or more parameters for beam management comprises selecting a number of SSBs for the UE to monitor.

2. The method of claim 1, wherein the detecting comprises:
   determining a set of one or more SSBs with received signal strength above a threshold signal strength value; and
   counting a number of the one or more SSBs in the set.

3. The method of claim 2, wherein the identifying comprises identifying the channel scattering type based on the number of the one or more SSBs in the set being less than or equal to a threshold number of SSBs.

4. The method of claim 2, wherein the identifying comprises identifying the channel scattering type based on the number of the one or more SSBs in the set being greater than or equal to a threshold number of SSBs.

5. The method of claim 2, wherein the identifying comprises:
   identifying a first channel scattering type based on the number of the one or more SSBs in the set being less than or equal to a first threshold number of SSBs; and
   identifying a second channel scattering type based on the number of the one or more SSBs in the set being greater than or equal to a second threshold number of SSBs, wherein the second threshold number of SSBs is greater than the first threshold number of SSBs by an offset value of one or more SSBs.

6. The method of claim 1, wherein the selecting further comprises selecting, based on the identified channel scattering type, a number of UE beams for the UE to monitor.

7. The method of claim 6, wherein the number of UE beams selected depends on a down sampling factor determined based on the identified channel scattering type.

8. The method of claim 1, wherein the selecting further comprises selecting, based on the identified channel scattering type, one or more filtering coefficients for beam management.

9. The method of claim 1, wherein the selecting further comprises selecting, based on the identified channel scattering type, at least one of: a time hysteresis parameter for beam switching or a power hysteresis parameter for beam switching.

10. A user equipment (UE) configured for wireless communication, the UE comprising:
    a memory comprising computer-executable instructions; and
    one or more processors configured to, individually or collectively, execute the computer-executable instructions and cause the UE to:
       detect one or more synchronization signal blocks (SSBs) transmitted from a network entity;
       identify a channel scattering type based on the detecting; and
       select one or more parameters for beam management, based on the identified channel scattering type, wherein the selecting the one or more parameters for beam management comprises selecting a number of SSBs for the UE to monitor.

11. The UE of claim 10, wherein the one or more processors are configured to, individually or collectively, execute the computer-executable instructions and cause the UE to:
    determine a set of one or more SSBs with received signal strength above a threshold signal strength value; and
    count a number of the one or more SSBs in the set.

12. The UE of claim 11, wherein the one or more processors are configured to, individually or collectively, execute the computer-executable instructions and cause the UE to identify the channel scattering type based on the number of the one or more SSBs in the set being less than or equal to a threshold number of SSBs.

13. The UE of claim 11, wherein the one or more processors are configured to, individually or collectively, execute the computer-executable instructions and cause the UE to identify the channel scattering type based on the number of the one or more SSBs in the set being greater than or equal to a threshold number of SSBs.

14. The UE of claim 11, wherein the one or more processors are configured to, individually or collectively, execute the computer-executable instructions and cause the UE to:
    identify a first channel scattering type based on the number of the one or more SSBs in the set being less than or equal to a first threshold number of SSBs; and
    identify a second channel scattering type based on the number of the one or more SSBs in the set being greater than or equal to a second threshold number of SSBs, wherein the second threshold number of SSBs is greater than the first threshold number of SSBs by an offset value of one or more SSBs.

15. The UE of claim 10, wherein the one or more processors are configured to, individually or collectively, execute the computer-executable instructions cause the UE to select, based on the identified channel scattering type, a number of UE beams for the UE to monitor.

16. The UE of claim 15, wherein the number of UE beams selected depends on a down sampling factor determined based on the identified channel scattering type.

17. The UE of claim 10, wherein the one or more processors are configured to, individually or collectively, execute the computer-executable instructions and cause the UE to select, based on the identified channel scattering type, one or more filtering coefficients for beam management.

18. The UE of claim 10, wherein the one or more processors are configured to, individually or collectively, execute the computer-executable instructions and cause the UE to select, based on the identified channel scattering type, at least one of: a time hysteresis parameter or a power hysteresis parameter for beam switching.

19. An apparatus for wireless communications by a user equipment (UE), comprising:
    means for detecting one or more synchronization signal blocks (SSBs) transmitted from a network entity;
    means for identifying a channel scattering type based on the detecting; and
    means for selecting one or more parameters for beam management, based on the identified channel scattering type, wherein the selecting the one or more parameters for beam management comprises selecting a number of SSBs for the UE to monitor.

20. A computer readable medium having instructions stored thereon that, when executed by one or more processors of a user equipment (UE), cause the UE to:
    detect one or more synchronization signal blocks (SSBs) transmitted from a network entity;
    identify a channel scattering type based on the detecting; and
    select one or more parameters for beam management, based on the identified channel scattering type, wherein the selecting the one or more parameters for beam management comprises selecting a number of SSBs for the UE to monitor.

* * * * *